United States Patent [19]
Ishizuka et al.

[11] Patent Number: 5,182,064
[45] Date of Patent: Jan. 26, 1993

[54] METHOD FOR PRODUCING FIBER REINFORCED PLASTIC RODS HAVING HELICAL RIBS

[75] Inventors: Hitoharu Ishizuka; Reiko Kubo, both of Mitaka, Japan

[73] Assignee: Nippon Petrochemicals Company, Limited, Tokyo, Japan

[21] Appl. No.: 715,382

[22] Filed: Jun. 14, 1991

[30] Foreign Application Priority Data

Oct. 17, 1990 [JP] Japan .................................. 2-278569

[51] Int. Cl.⁵ ............................................. B29C 67/00
[52] U.S. Cl. ..................................... 264/137; 264/257; 264/258
[58] Field of Search .............. 201/135, 136, 137, 257, 201/258

[56] References Cited

FOREIGN PATENT DOCUMENTS

| 0148087 | 11/1979 | Japan | 264/137 |
| 235115 | 10/1986 | Japan . | |
| 139735 | 6/1988 | Japan . | |

Primary Examiner—Tim Heitbrink
Attorney, Agent, or Firm—Scully, Scott, Murphy & Presser

[57] ABSTRACT

A method for producing a fiber reinforced plastic rod having ribs on its surface by impregnating a reinforcing material which has continuous long fiber bundles with an uncured liquid resin. A rib forming member is separately prepared by impregnating a fiber bundle reinforcing material with an uncured liquid resin. A fiber reinforced plastic rod is formed by helically applying the rib forming member to the surface of the substrate forming member and together curing the two members into an integral body. A fiber reinforced plastic rod, prepared in accordance with this method, is also described.

9 Claims, 3 Drawing Sheets

METHOD FOR PRODUCING FIBER REINFORCED PLASTIC RODS HAVING HELICAL RIBS

BACKGROUND OF THE INVENTION (1) Field of the invention

This invention relates to a fiber reinforced plastics rod having helical ribs on their surfaces and a method for producing the same. The fiber reinforced plastics rods of the present invention can be used in place of the reinforcing steel rods, which are embedded in various concrete structures.

(2) Description of the Prior Art

In the conventional art, fiber reinforced plastics rods having helical elevated portions on their surfaces were made by the following steps.

In the first place, strands are made by arranging together 50 to 30,000 of long filaments of glass fiber, carbon fiber or synthetic fiber, and 8 to 120 of the strands are put together to obtain rovings or tows. They are then arranged together, and passed through and impregnated with a liquid of synthetic resin such as unsaturated polyester resin or epoxy resin to obtain impregnated materials. They are further passed through a die or scraped with a doctor knife in order to remove the excess resin clinging on them. After that, they are passed through a heated die or an oven so as to cure the impregnated resin, thereby obtaining rods having smooth surfaces. In the next place, helical grooves are formed in the surfaces of the rods using a lathe to leave helical elevated portions on the surfaces of the rods.

In these rods having helical elevated portions, however, because long fibers are embedded in the resin in parallel with the length of the rods, the long fibers in the surface portions are cut off in the process to form the helical grooves. As a result, the reinforcing fibers in the helical elevated portions (corresponding to screw threads) exist as short fibers oriented in a single direction. Accordingly, the strength in the helical elevated portions is lowered and the elevated portions are sometimes caused to split and scaled off from the body of plastics rods.

In order to avoid the disadvantage like this, an improved idea is disclosed in Japanese Laid-Open Patent Publication No. 61-235115. In the art disclosed in this reference, compression molding is carried out by introducing a synthetic resin material containing continuous reinforcing fiber into a compression mold to form a reinforced material having projections on the surface thereof. The compression mold is then opened and, simultaneously with the taking out of the formed reinforced material, the next uncured material subsequent to the already formed part is shifted into the compression mold and, by closing the mold, the compression molding is repeated again to form the next continued portion of the reinforced material having projections.

It is to be noted, however, that this method cannot be carried out continuously to produce the reinforced materials, which is not desirable in that the efficiency of molding process is not high.

Meanwhile, disclosed in Japanese Laid-Open Patent Publication No. 63-139735 is another kind of fiber reinforced resin rods. In the production of this fiber reinforced resin rod, an already cured fiber reinforced resin substrate rod is prepared by using a reinforcing material of fibers which are arranged in parallel to each other and oriented in the longitudinal direction of the rod. Continuous fiber is impregnated with uncured resin and it is applied helically to the surface of the above cured resin substrate rod and the applied impregnated fiber is then cured to obtained the final product of a fiber reinforced resin rod.

However, this rod is produced by helically applying continuous fibers which are impregnated with uncured resin to the surface of an already cured fiber reinforced substrate rod, and the curing operation is done again to harden the externally applied resin impregnated fiber. Accordingly, a boundary exists between the formerly cured substrate rod and the subsequently cured resin impregnated fibers. This means that both the materials are connected simply by physical adherent force. Therefore, when any external force that is larger than the force of adherence is applied to the boundary portion by some causes, both the materials are easily broken apart at the boundary portion.

SUMMARY OF THE INVENTION

It is, therefore, the primary object of the present invention to provide an improved fiber reinforced plastics rods having helical ribs on their surfaces. The helical ribs can be joined firmly to the substrate forming member.

Another object of the present invention is to provide an improved method for continuously producing the above-mentioned excellent fiber reinforced plastics rods.

In accordance with the present invention, the fiber reinforced plastics rod having ribs on its surface is prepared by helically applying a rib forming member consisting of a reinforcing material of fiber bundles on the surface of a substrate forming member consisting of a reinforcing material of continuous long fiber bundles and an uncured liquid resin and they are then cured together into an integral body.

Furthermore, the fiber reinforced plastics rod can be provided with additional rib forming member in crosswise direction relative to the above rib forming member.

This invention also relates to a method for producing the above fiber reinforced plastics rod having ribs on its surface. The method comprises the steps of: preparing a substrate forming member by impregnating a reinforcing material of continuous long fiber bundles with an uncured liquid resin; separately preparing a rib forming member consisting of a reinforcing material of fiber bundles; applying helically the rib forming member on the surface of the substrate forming member and then allowing the uncured liquid resin to impregnate into said rib forming member; and finally curing the substrate forming member together with the rod forming member into an integral body.

The above method can be further modified such that the rib forming member is made by previously impregnating a reinforcing material with an uncured liquid resin and it is applied helically to the surface of the substrate forming member, and then the substrate forming member is cured together with the rod forming member into an integral body.

BRIEF DESCRIPTION OF THE DRAWINGS

These and other objects and features of the present invention will become more apparent to those skilled in the art with reference to the following detailed description taken in connection with the accompanying drawings in which.

DETAILED DESCRIPTION OF PREFERRED EMBODIMENTS

Figure 1:
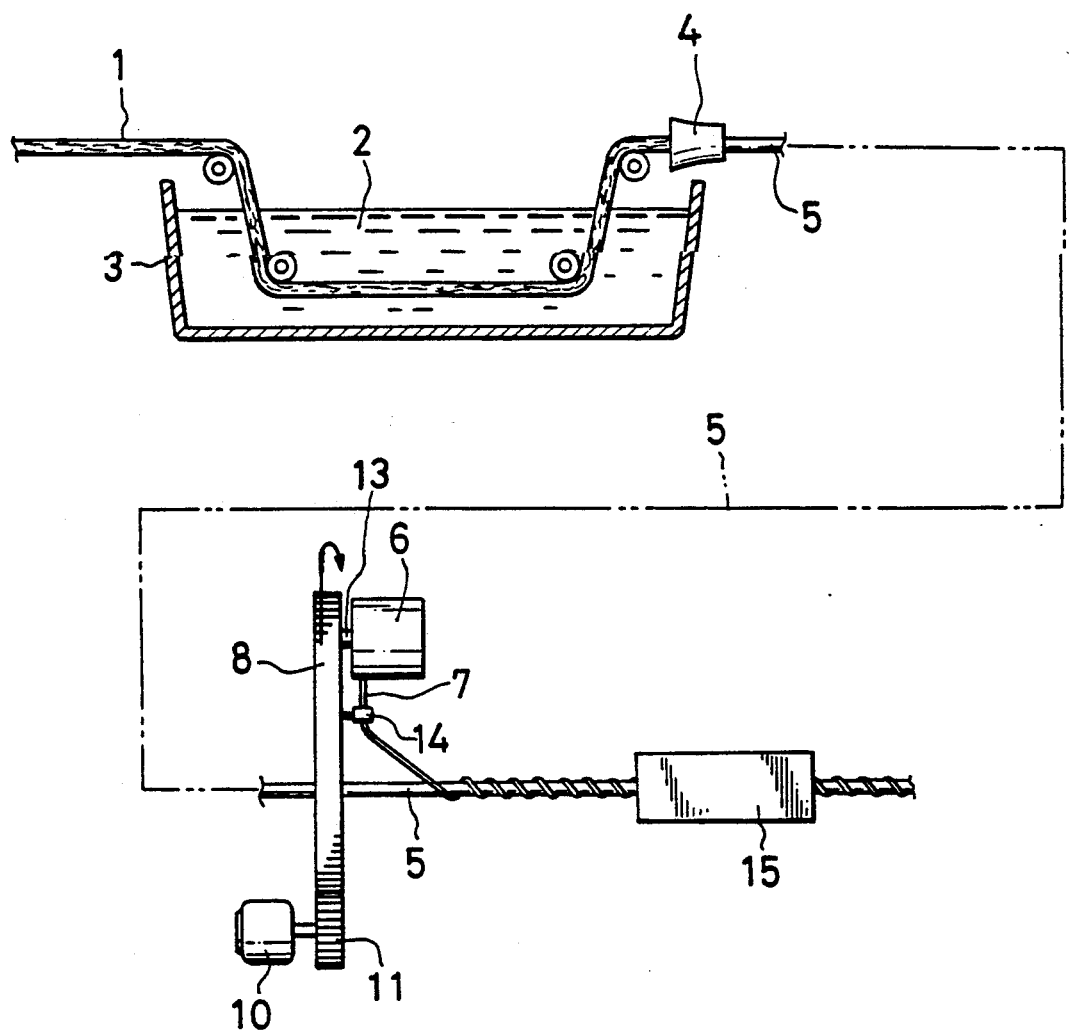
FIG. 1 is a schematic illustration of a first embodiment of the production process according to the method of the present invention.

The fiber reinforced plastics rod according to the present invention is characterized in that a rib forming member consisting of a reinforcing material of fiber bundles and optionally an uncured resin is applied helically to the surface of a substrate forming member which consists of an uncured resin and a reinforcing material of continuous long fiber bundles, and they are then cured together. More particularly, after the continuous long fiber bundles are impregnated with a resin, the excess portion of the resin is removed to provide continuously a substrate forming member, at the same time, the above rib forming member is continuously wound integrally around the above substrate forming member. After that they ar completely cured together.

The above-mentioned continuous long fiber bundles employed as reinforcing materials for the substrate forming member are exemplified by rovings or tows which are made by arranging 8 to 120 strands together, which strands are made by putting together 50 to 30,000 of long filaments of fibers such as glass fiber, carbon fiber and synthetic fiber.

The above rib forming member is exemplified by the long fiber bundles like those used for the above substrate forming member, or twisted material of these long fiber bundles, span roving or short fiber roving. In practice, at least one of them is used without impregnation with any resin or with impregnating with an uncured resin. The resins used for the substrate forming member and rib forming member are thermosetting resins such as unsaturated polyester resin, vinyl ester resin and epoxy resin.

According to the kind of used resin, the fiber bundles for the substrate forming member and the rib forming member are preferably subjected to appropriate surface pretreatment such as oxidation, silane or Boran treatment in order to enhance the adherence to the resin.

The content of the long fiber bundles in the substrate forming member is most preferably in the range of about 30 to 70% by volume.

According to the method of the present invention, the rib forming member ca be wound around the substrate forming member through the following manner.

A package supporting member is located at a distance apart from the substrate forming member and the package supporting member is rotated around the substrate forming member. The package of rib forming member is attached to the above package supporting member and the rib forming member is paid out from the package and the rib forming member is applied t the surface of the substrate forming member, during which the package is revolved around the substrate forming member with the rotation of the package supporting member. In another embodiment, a pair of package supporting members ar provide and packages to supply rib forming members are attached to the above supporting members, respectively, and they are rotated in counter directions so as to perform the helical supply of the rib forming members in a crosswise fashion. The pitch of helical winding of the rib forming member can be varied by controlling the feed rate of the substrate forming member or the angular velocity of the package supporting member.

The above package supporting member can support one or more packages of rib forming members.

When the rib forming member is impregnated with a resin by being passed through a bath of resin or being sprayed with resin before it is wound around the substrate forming member, the rib forming member can be joined more firmly to the substrate forming member with the aid of the resin contained in the substrate forming member. When the rib forming member is applied to the substrate forming member under a certain tension, the rib forming member bites the surface of substrate forming member, so that the functions of permeation and mingling of uncured resin to the rib forming member are enhanced and strong adhesion of both members can be attained. In addition, the physical anchor effect can also be expected.

The excess resin on the substrate forming member and the rib forming members can be removed by any ordinary measures using a die, squeezing ring or doctor knife. It is to be noted that the continuous long fiber used for the substrate forming member and the one used for the rib forming member may be either the same material or different ones.

PREPARATION PROCESS

The fiber reinforced plastics rod of the present invention can be made by the following process.

As shown in FIG. 1, the above-described continuous long fiber bundle 1 is paid out from a package of fiber bundle (not shown) and the fiber bundle is introduced into a resin impregnation vessel 3 which is filled with a resin 2 such as unsaturated polyester resin liquid. The fiber bundle 1 which is impregnated with the resin is then passed through a die 4 so as to remove excess resin, thereby obtaining continuously a long substrate forming member 5. The impregnated resin in the thus obtained substrate forming member 5 is not yet cured on this stage.

Meanwhile, a package 6 carrying a rib forming member 7 is secured to a package supporting member 8. This package supporting member 8 rotates around the passage of the substrate forming member 5.

Figure 2:
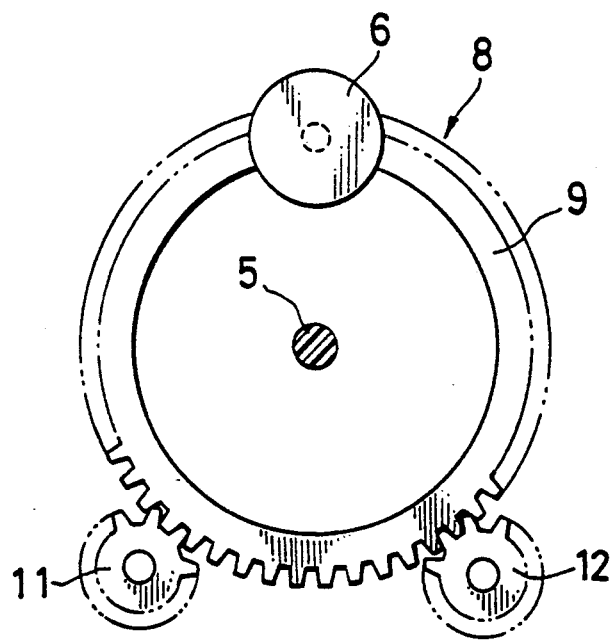
FIG. 2 is a front view of a package supporting member.

As shown in FIGS. 1 and 2, the package supporting member 8 is so located as to allow the substrate forming member 5 to pass through the center of an annular gear 9. The annular gear 9 engages with a driving gear 11 and a follower gear 12, wherein the driving gear 11 is driven by a motor 10. The package 6 of rib forming member 7 is attached to a hook 13 formed on a side wall of the annular gear 9. Thus, the package 6 is revolved around the substrate forming member 5 with the rotation of the driving gear 11.

Figure 3:
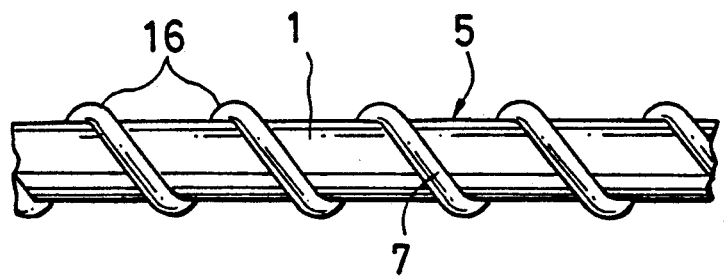
FIG. 3 is a side view of a first embodiment of the fiber reinforced plastics rod of the present invention.

The rib forming member 7 is fed from the package 6 that is supported on the rotating supporting member 8 through a guide 14 to the external surface of the substrate forming member 5 which is continuously being shifted forward (to the right side of FIG. 1). The guide 14 is attached to the supporting member 8 and moved round with the rotation of the supporting member 8. In this step, the uncured resin which is contained in the substrate forming member 5 permeates into the rib forming member 7. After that, it is passed through an oven 15 in which the impregnated resin is cured. As a result, the substrate forming member 5 and the rib forming member 7 ar integrally joined together to provide a fiber reinforced plastics rod having helical ribs 16 of the present invention, as shown in FIG. 3.

Furthermore, it is possible according to the present invention to form a fiber reinforced plastics rod of another type in which a plurality of rib forming members are applied to the surface of the substrate forming member in crosswise manner. This fiber reinforced plastics rod can be produced in the process as follows.

Figure 4:
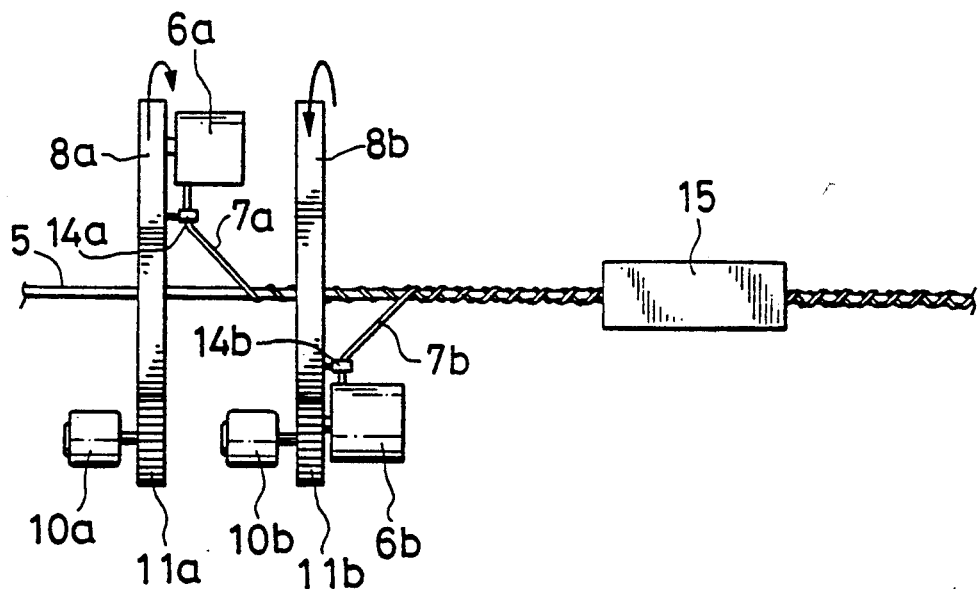
FIG. 4 is a schematic illustration of the main part of a second embodiment of the production process according to the present invention.

As shown in FIG. 4, a substrate forming member 5 is impregnated with a resin and it is shifted forward just like the foregoing embodiment. For the application of rib forming members 7a and 7b, a pair of package supporting members 8a and 8b are installed and one supporting member 8a is rotated clockwise (as viewed from the right side of FIG. 4) and the other supporting member 8b is rotated counter-clockwise. Packages 6a and 6b are attached to these supporting members 8a and 8b, respectively.

The package supporting member 8a is engaged with a driving gear 11a and a follower gear (not shown) where the driving gear 11a is driven by a motor 10a. While, the other package supporting member 8b is engaged with a driving gear 11b and a follower gear (not shown) where the driving gear 11b is driven by the other motor 10b. The constitution of each of the above assemblies is just the same as the package supporting member 8 of the foregoing embodiment shown in FIG. 2.

Figure 5:
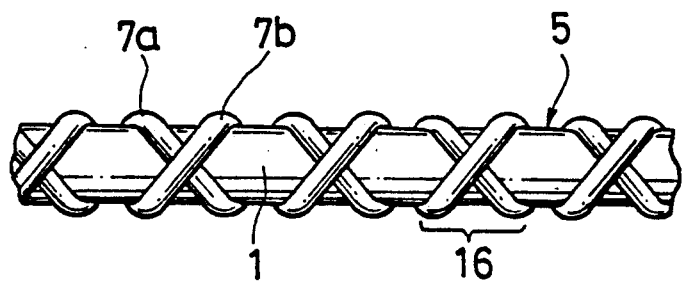
FIG. 5 is a second embodiment of the fiber reinforced plastics rod of the present invention.

The rib forming member 7a is fed from the package 6a that is supported on the clockwise rotating supporting member 8a through a guide 14a and it is wound helically on the external surface of the substrate forming member 5 which is continuously shifted forward. The other rib forming member 7b is fed from the package 6b that is supported on the counter-clockwise rotating supporting member 8b through a guide 14b and it is wound also on the external surface of the substrate forming member 5, where the direction of the winding of the rib forming member 7b is reverse to that of the former rib forming member 7a. In this step, the uncured resin which is contained in the substrate forming member 5 permeates into the rib forming members 7a and 7b. After that, it is passed through an oven 15 in which the impregnated resin is cured. As a result, the substrate forming member 5 and the rib forming members 7a and 7b are joined together to provide a fiber reinforced plastics rod of the present invention in another type which has intercrossing helical ribs 16 as shown in FIG. 5.

PREPARATION EXAMPLE 1

A glass fiber roving (2400 g/km, made by Nitto Boseki Co., Ltd., type: RS 240 PE 535) was used as a substrate forming member. The substrate forming member which consists of 47 glass fiber rovings was drawn out from 47 packages and the substrate forming member was then led into a vessel of vinyl ester resin so as to impregnate it with the resin liquid. The excess resin was removed by a squeezing ring of 11 mm in diameter to obtain a round rod-like substrate forming member containing uncured resin (drawing rate: 1 m/min).

A pair of packages for rib forming members were prepared, wherein seven of the above glass rovings were arranged together and twisted (10 twists/m) to obtain each package. They were respectively set to supporting members which were rotating in counter directions and the rib forming members were helically applied to the substrate forming member at 30 windings/min under a tension of 1 kg. Thus, the rib forming members were impregnated with a part of the resin contained in the substrate forming member. After removing excess resin, both the combined materials were cured into an integral body by being passed continuously through an air oven (4 m in length) with forced circulation at 180° C. The cured product was continuously drawn by a hydraulic clamp puller and was cut at a necessary length.

The sizes of the thus obtained glass fiber reinforced plastics rod having ribs were 10 mm in the average diameter of the substrate forming member as a core, 3 cm in the pitch of ribs, and 2 to 3 mm in the height of ribs.

PREPARATION EXAMPLE 2

A carbon fiber reinforced plastics rod was made in the like manner as Preparation Example 1, except the following conditions. In place of the glass rovings used for making the substrate forming member in Preparation Example 1, another roving (made by Toray Industries, Inc., trademark: TORECA T300-12K, 792 g/km, 15 twists/m) was used. The rovings were drawn out from 104 packages to form a substrate forming member. While, two packages were prepared by arranging together 13 of the above T300-12K rovings with 5 twists/m, which were used for rib forming members. As a result, the external appearance and sizes of the obtained product were almost the same as those prepared in the foregoing Preparation Example 1.

COMPARATIVE EXAMPLE 1

A glass fiber roving (2400 g/km, made by Nitto Boseki Co., Ltd., type: RS 240 PE 535) was used for preparing a substrate forming member. The substrate forming member consisting of 47 glass fiber rovings were drawn out from 47 packages and it was led into a vessel of vinyl ester resin so as to impregnate it with the resin. The excess resin was removed by a squeezing ring of 11 mm in diameter to obtain a round rod-like member. It was then passed through a round metal mold (diameter: 10 mm, length: 60 cm) to obtain continuously a cured round rod (drawing rate: 1 m/min). This rod was cut at necessary lengths and the surfaces of the rod was roughened with a centerless grinder.

Seven of the above glass rovings were arranged together and twisted (10 twists/m) to obtain a rib forming member. This member was wound around the above round rod with using the above-mentioned resin by means of a filament winding machine and it was cured in an air oven at 180° C. for 1 hour.

The sizes of the thus obtained glass fiber reinforced plastics rod having ribs were 10 mm in the diameter of substrate forming member, 3 cm in the pitch of ribs, and 3 to 4 mm in the height of ribs.

The rods prepared in the foregoing Preparation Examples 1 and 2 and Comparative Example 1 were subjected to pull-out test. In the test, test pieces were prepared by burying 10 cm of these rods in concrete and necessary force to pull out these rods was measured under a pulling rate of 1 mm/min. The results are shown in the following Table 1.

TABLE 1

| Examples | Pull-Out Force |
|---|---|
| Preparation Example 1 | 4.3 t |
| Preparation Example 2 | 5.6 t |
| Comparative Example 1 | 2.1 t |

CONCLUSION

As described above in detail, the present invention relates to a fiber reinforced plastics rod having ribs and a method for producing the same, which method is characterized in the steps of helically applying a rib forming member consisting of a reinforcing material of fiber bundles on the surface of a substrate forming member consisting of a reinforcing material of continuous long fiber bundles and an uncured liquid resin and then curing the above two members together into an integral body.

According to the present invention, continuous long fiber bundles are impregnated with a resin and, with removing excess resin, the rib forming member is wound around the substrate forming member containing uncured resin and then the resin component is cured to obtain the fiber reinforced rod, in which both the members are firmly secured to each other.

Accordingly, even when strong force is applied to the rib portion, the rib is not split off or peeled off. As a result, the rod according to the present invention can be employed as a fiber reinforced plastics rod of light in weight, high in mechanical strength and easy in handling, and it can be used in place of ordinary reinforcing steel rods which are embedded in various concrete structures. In addition, in accordance with the method of the present invention, the fiber reinforced rod of the present invention can be produced efficiently in a continuous process.

What is claimed is:

1. A method for producing a fiber reinforced plastic rod having ribs on its surface, which method comprises the steps of:

preparing a substrate forming member by impregnating a reinforcing material of continuous long fiber bundles with an uncured liquid resin;

separately preparing a rib forming member consisting of a reinforcing material of fiber bundles;

helically applying said rib forming member on the surface of said substrate forming member under tension such that said rib forming member partially sinks into the surface portion of said substrate member and allowing said uncured liquid resin of said substrate forming member to impregnate into said rib forming member; and curing said substrate forming member together with said rod forming member into an integral body.

2. A method for producing a fiber reinforced plastic rod having ribs on its surface, which method comprises the steps of:

preparing a substrate forming member by impregnating a reinforcing material of continuous long fiber bundles with an uncured liquid resin;

separately preparing a rib forming member by impregnating a reinforcing material of fiber bundles with an uncured liquid resin;

helically applying said rib forming member on the surface of said substrate forming member under tension such that said rib forming member partially sinks into the surface of said substrate forming member; and curing said substrate forming member together with said rod forming member into an integral body.

3. The method for producing a fiber reinforced plastic rod having ribs on its surface as claimed in claim 1 or 2, wherein excess resin applied to said substrate forming member is removed.

4. The method for producing a fiber reinforced plastic rod having ribs on its surface as claimed in claim 1 or 2, wherein another rib forming member is additionally applied to said substrate forming member in crosswise direction relative to said rib forming member.

5. The method for producing fiber reinforced plastic rod having ribs on its surface as claimed in claim 1 or 2, wherein said uncured resin comprises one member selected from the group consisting of unsaturated polyester resin, vinyl ester resin and epoxy resin.

6. The method for producing a fiber reinforced plastic rod having ribs on its surface as claimed in claim 1 or 2, wherein said fiber of said long fiber bundles of said substrate forming member comprises at least one member selected from the group consisting of glass fiber, carbon fiber and synthetic fiber.

7. The method for producing a fiber reinforced plastic rod having ribs on its surface as claimed in claim 1 or 2, wherein said fiber bundles of said rib forming member comprises at least one member selected from the group consisting of bundles of continuous long fiber, span roving and short fiber roving.

8. The method for producing a fiber reinforced plastic rod having ribs on its surface as claimed in claim 1 or 2, wherein a package supporting member in ring form is provided so as to allow said substrate forming member to pass through said package supporting member and the package of said fiber bundles of said rib forming member is supported by said package supporting member, thereby helically applying said rib forming member on the surface of said substrate forming member by rotating said package supporting member.

9. The method for producing a fiber reinforced plastic rod having ribs on its surface as claimed in claim 1 or 2, wherein a pair of package supporting members in ring form is provided so as to allow said substrate forming member to pass through said pair of package supporting members, packages of said fiber bundles for said rib forming members are respectively supported by said package supporting members, and one of package supporting members is rotated in one direction and the other of said package supporting member is rotated in the opposite direction, thereby helically applying said rib forming members on the surface of said substrate forming member in crosswise fashion.

* * * * *